Patented Mar. 28, 1939

2,152,003

UNITED STATES PATENT OFFICE 2,152,003

INSECTICIDE AND FUMIGANT

Adrianus Johannes van Peski and Johan Marius Hoeffelman, Amsterdam, Netherlands, assignors to Shell Development Company, San Francisco, Calif., a corporation of Delaware No Drawing. Application October 12, 1936, Serial No. 105,268. In the Netherlands October 29, 1935

12 Claims. (Cl. 167—33)

This invention relates to materials useful for insecticidal, fungicidal and bactericidal purposes, and deals with a new class of compounds which are particularly advantageous for such uses.

One object of the invention is to provide a material which is relatively non-toxic to man and which can be used in combating economically harmful plant and animal organisms.

Another object of the invention is to provide a fumigant of high effectiveness which may be more easily shipped, stored and handled than the usual gaseous agents customarily employed for the same purposes.

We have found that oxides derived from substituted or non-substituted hydrocarbons with more than one double bond, either combined or not with other substances, are eminently suitable for the above purposes. A particularly effective sub-group under this new class of insecticides is one composed of compounds containing at least one multiple bond and one or more epoxy groups as these have an especially high toxicity.

The following are examples of substances which may be used according to the invention:

Butadiene monoxide 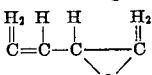

Butadiene dioxide 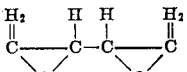

Isoprene oxide 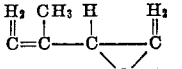

Chloroprene oxide 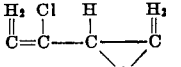

Divinylacetylene oxide 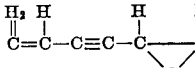

2.5-dihydrofurane 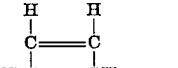

Allene monoxide 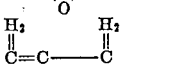

Cyclohexadiene dioxide 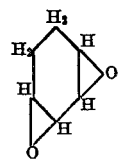

Styrene oxide 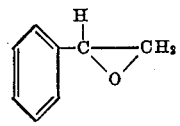

Vinylcyclohexene monoxide 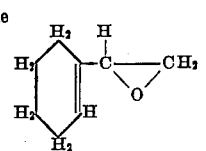

3,4 oxydobutenyl arsine .2 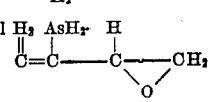

Oxides which are useful in accordance with the present invention may be derived from aliphatic, cyclic or aliphatic-cyclic hydrocarbons with more than one multiple bond which bonds may be either double or triple bonds, or both. In the case of mixed aliphatic-cyclic hydrocarbons the bonds may be present only in the cyclic part of the molecule or only in the aliphatic part or in both the cyclic and aliphatic parts. The hydrocarbon from which the oxides have been derived may be substituted by suitable groups such, for example, as alkyl, aryl, $NH_2$, OH, COOH, CN, $AsH_2$ and the like or by halogen, sulfur, etc.

In general, the oxides used in our invention are well known chemical compounds and various methods of making them are also known and described in the literature. Butadiene monoxide, for example, may be prepared by adding hypochlorous acid to butadiene and then splitting off hydrogen chloride from the resulting α butadiene chlorhydrine. It is not necessary to start from hydrocarbons with more than one multiple bond, however. For example, butadiene monoxide may also be produced by chlorinating α butene oxide to δ chlorbutene oxide and splitting off hydrochloric acid from the latter by treatment with an alkaline agent.

The oxides may be applied as such or combined with other substances. Said other substances may solely act as diluents or carriers, but they may also themselves have an insecticidal, fungicidal or bactericidal action, as for example HCN, CS₂, vinyl chloride, ethylene oxide and the like, or other actions, as is the case, for example, with carbonic acid, which stimulates the activity of butadiene monoxide.

The lower oxides are generally volatile substances and for this reason may be used as gassing insecticide; the higher molecular oxides are not or less volatile and may be applied as contacting or stomachal insecticides.

For the purpose of making our invention more clear it will be described with more particular reference to the use of butadiene monoxide. It will be understood that this implies no limitation on our invention, however, as other epoxy derivatives of hydrocarbons containing more than one multiple bond and particularly unsaturated epoxy compounds are also effective in similar applications.

Butadiene monoxide is a liquid boiling at about 65° C. which is easily shipped, stored and handled in ordinary liquid containers. It is particularly useful as a so-called gassing insecticide in destroying insects in foodstuffs, warehouses, dwellings and ships and furthermore, may be used to kill vermin on human beings and animals. The following comparative experiments illustrate the unusual activity of such oxides.

For the destruction of the so-called "corn-beetle" in a certain quantity of stored grain 8 grams butadiene oxide was introduced per cubic meter of grain. The beetles were killed within 24 hours. In comparison with this 10 grams ethene oxide was required per cubic meter for the destruction of the beetles in an equal space of time.

The toxicity of butadiene monoxide with respect to cockroaches is about six times higher than that of ethylene oxide. Furthermore, experiments with rats have shown that the toxicity of butadiene monoxide and of ethylene oxide are approximately equal, from which it may be concluded that since butadiene monoxide can be used in a smaller proportion without impairing its insecticidal effectiveness, it will thus be less toxic to human beings than ethylene oxide in use.

Butadiene monoxide in which the epoxy group is linked to the first and fourth carbon atoms is also effective in destroying cockroaches. As fumigants unsaturated epoxy compounds and polyepoxy compounds boiling below 100° C. are preferred.

While we have in the foregoing described in some detail the preferred embodiment of our invention and some variants thereof, it will be understood that this is only for the purpose of making the invention more clear and that the invention is not to be regarded as limited to the details of operation described, nor it is dependent upon the soundness or accuracy of the theories advanced as to the advantageous results attained. On the other hand, the invention is to be regarded as limited only by the terms of the accompanying claims, in which it is our intention to claim all novelty inherent therein as broadly as is possible in view of the prior art.

We claim as our invention:

1. An insecticide, fungicide and bactericide composition containing an effective amount of an epoxide of an unsaturated organic compound having more than one multiple bond.

2. An insecticide, fungicide and bactericide composition containing an effective amount of an organic compound of the class consisting of unsaturated monoepoxy compounds, unsaturated polyepoxy compounds, and saturated polyepoxy compounds.

3. An insecticide, fungicide and bactericide composition containing an effective amount of an unsaturated aliphatic epoxy compound which contains an epoxy oxygen atom linked to contiguous carbon atoms.

4. An insecticide, fungicide and bactericide composition containing an effective amount of an epoxide of an unsaturated hydrocarbon having more than one multiple bond.

5. An insecticide, fungicide and bactericide composition containing an effective amount of an epoxide of an unsaturated aliphatic hydrocarbon having more than one multiple bond.

6. An insecticide, fungicide and bactericide composition containing an effective amount of an epoxide of a diolefine in which the oxygen is linked to contiguous carbon atoms.

7. An insecticide, fungicide and bactericide composition containing an effective amount of an epoxide of butadiene.

8. An insecticide, fungicide and bactericide composition containing an effective amount of a monoxide of butadiene.

9. An insecticide, fungicide and batericide composition containing an effective amount of butadiene monoxide.

10. An insecticide, fungicide and bactericide composition containing an effective amount of an epoxide of an unsaturated aliphatic hydrocarbon having more than one multiple bond in which the oxygen is linked to contiguous carbon atoms.

11. An insecticide containing as an active ingredient an organic polyepoxy compound which contains an epoxy oxygen atom linked to contiguous carbon atoms.

12. A composition for combating insects containing an effective amount of butadiene dioxide.

ADRIANUS JOHANNES van PESKI.
JOHAN MARIUS HOEFFELMAN.